(12) United States Patent
Ricketts et al.

(10) Patent No.: US 10,674,671 B2
(45) Date of Patent: Jun. 9, 2020

(54) AUXILIARY PROCESSING SYSTEM

(71) Applicant: CNH Industrial America LLC, New Holland, PA (US)

(72) Inventors: Jonathan E. Ricketts, Coal Valley, IL (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 174 days.

(21) Appl. No.: 15/835,568

(22) Filed: Dec. 8, 2017

(65) Prior Publication Data
US 2019/0174677 A1   Jun. 13, 2019

(51) Int. Cl.
*A01F 12/20* (2006.01)
*A01F 12/40* (2006.01)
(Continued)

(52) U.S. Cl.
CPC .............. *A01F 12/20* (2013.01); *A01F 12/18* (2013.01); *A01F 12/26* (2013.01); *A01F 12/40* (2013.01); *A01F 29/04* (2013.01); *A01D 41/1243* (2013.01); *A01F 7/04* (2013.01); *A01F 12/444* (2013.01); *A01F 12/46* (2013.01); *A01F 12/56* (2013.01); *A01F 2012/188* (2013.01)

(58) Field of Classification Search
CPC .......... A01F 12/20; A01F 12/26; A01F 29/04; A01F 12/40; A01F 12/18; A01F 12/46; A01F 12/444; A01F 2012/188; A01F 12/56; A01F 7/04; A01D 41/1243
See application file for complete search history.

(56) References Cited

U.S. PATENT DOCUMENTS

| 2,875,768 A | 3/1959 | Belowski et al. |
| 3,983,883 A | 10/1976 | Ashton et al. |

(Continued)

FOREIGN PATENT DOCUMENTS

| CN | 204392895 U | 6/2015 |
| CN | 108207290 A | 6/2018 |
| EP | 3146831 A1 | 3/2017 |

OTHER PUBLICATIONS

Extended European Search Report for EP Application No. 18203256 dated Feb. 20, 2019 (7 pages).

*Primary Examiner* — Arpad Fabian-Kovacs
(74) *Attorney, Agent, or Firm* — Peter Zacharias; Patrick Sheldrake

(57) ABSTRACT

An agricultural vehicle includes a chassis, a threshing and separating mechanism supported by the chassis and configured for threshing and separating a crop material, a cleaning system positioned downstream of the threshing and separating mechanism in a direction of crop material flow, and an auxiliary processing system positioned downstream of the threshing and separating mechanism in the direction of crop material flow. The auxiliary processing system has an inlet and an outlet, and includes a discharge chopper having an end and a first direction of rotation about an axis of rotation. The auxiliary processing system also includes at least one rethreshing element coaxially aligned with the discharge chopper and adjacent to the end of the discharge chopper and having a second direction of rotation opposite to the first direction of rotation of the discharge chopper.

18 Claims, 6 Drawing Sheets

(51) Int. Cl.
  *A01F 12/18* (2006.01)
  *A01F 12/26* (2006.01)
  *A01F 29/04* (2006.01)
  *A01F 12/56* (2006.01)
  *A01F 7/04* (2006.01)
  *A01D 41/12* (2006.01)
  *A01F 12/44* (2006.01)
  *A01F 12/46* (2006.01)

(56) References Cited

U.S. PATENT DOCUMENTS

| | | | | |
|---|---|---|---|---|
| 4,178,944 | A | * | 12/1979 | Hanaway .................. A01F 7/04 460/13 |
| 4,188,160 | A | | 2/1980 | Corbett et al. |
| 4,466,447 | A | * | 8/1984 | Hoefer .................... A01F 12/52 460/13 |
| 4,474,188 | A | | 10/1984 | Kashino et al. |
| 4,637,406 | A | * | 1/1987 | Guinn .................... A01F 12/40 241/101.71 |
| 4,884,993 | A | | 12/1989 | Hemker et al. |
| 5,497,605 | A | | 3/1996 | Underwood et al. |
| 6,547,169 | B1 | * | 4/2003 | Matousek .......... A01D 41/1243 239/661 |
| 7,044,853 | B2 | * | 5/2006 | Weichholdt ........ A01D 41/1243 460/112 |
| 7,484,350 | B2 | * | 2/2009 | Benes ..................... A01F 12/40 56/504 |
| 7,934,982 | B2 | * | 5/2011 | Pope ...................... A01F 12/52 460/14 |
| 8,177,610 | B2 | * | 5/2012 | Birrell ................ A01D 41/1243 460/111 |
| 2009/0156277 | A1 | * | 6/2009 | Benes ................ A01D 41/1243 460/112 |
| 2011/0053669 | A1 | * | 3/2011 | Weichholdt ........ A01D 41/1243 460/112 |
| 2016/0007537 | A1 | * | 1/2016 | Dilts ...................... A01F 12/40 460/112 |
| 2016/0088794 | A1 | * | 3/2016 | Baumgarten ........ A01D 41/127 460/1 |
| 2017/0034997 | A1 | * | 2/2017 | Mayerle .................. A01F 12/40 |
| 2017/0202142 | A1 | | 7/2017 | Dilts et al. |
| 2018/0070534 | A1 | * | 3/2018 | Mayerle .................. A01F 12/40 |
| 2018/0084718 | A1 | * | 3/2018 | Baumgarten ...... A01D 41/1243 |
| 2018/0317392 | A1 | * | 11/2018 | Mayerle .................. A01F 12/40 |
| 2018/0352739 | A1 | * | 12/2018 | Puryk ................ A01D 41/1243 |
| 2018/0352748 | A1 | * | 12/2018 | Rittershofer ............ A01F 12/48 |
| 2018/0368319 | A1 | * | 12/2018 | Desmet .............. A01D 41/1243 |

\* cited by examiner

AUXILIARY PROCESSING SYSTEM

FIELD OF THE INVENTION

The present invention pertains to agricultural vehicles, and, more particularly, to agricultural vehicles which include a rethreshing system.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Material other than grain (MOG) such as straw from the threshing section proceeds through a straw chopper and out the rear of the combine to more easily incorporate the remaining residue in subsequent tillage practices. Once the grain is threshed it falls through perforations in the concaves and is transported to a grain pan. From the grain pan the grain is cleaned using a cleaning system. The cleaning system includes a cleaning fan which blows air through oscillating sieves or shoes to discharge chaff and other debris toward the rear of the combine. The clean grain is then transported upwards via a clean grain elevator to a grain tank onboard the combine. When the grain tank becomes full, the combine is positioned adjacent a vehicle into which the grain is to be unloaded, and an unloading system, e.g., an unloading auger, on the combine is actuated to transfer the grain into the vehicle.

The combine may additionally include a rethreshing process to recapture the "tailings", i.e. the remaining grain and MOG mixture that is left over after the cleaning process. The tailings may include the grain that is still attached to the fragments of a head, as in barley, or it may include the kernels that are attached to the fragments of a cob, as in corn. Generally, the tailings are either rethreshed through the main threshing mechanism, such as a conventional cylinder, or processed through an additional threshing unit. Typically, after the cleaning process a tailings auger and/or conveyor is used to transport the tailings to one or both sides of the combine and back to the main threshing mechanism or additional threshing unit. After rethreshing, the tailings are returned to the cleaning system. If an additional threshing unit is used, the tailings may be returned to the cleaning system by impellers, blowers, and/or augers.

If the main threshing mechanism is used for rethreshing, the tailings may overload the main threshing mechanism and will inevitably cause excessive wear on the main threshing mechanism. If an additional, separate threshing mechanism is used for rethreshing, the load on the main threshing mechanism is lessened; however, the processing results are generally inferior compared to rethreshing the material through the main threshing mechanism. Additionally, an externally mounted additional threshing mechanism can be cumbersome and may occupy a large amount of space on the exterior of the combine.

What is needed in the art is an agricultural harvester that can efficiently and cost-effectively rethresh tailings.

SUMMARY OF THE INVENTION

In one exemplary embodiment provided in accordance with the present invention, an agricultural vehicle has an auxiliary processing system for processing and rethreshing crop material. The auxiliary processing system generally includes a discharge chopper, at least one rethreshing element coaxial with the discharge chopper, and at least one concave.

In another exemplary embodiment provided in accordance with the present invention, an agricultural vehicle includes a chassis, a threshing and separating mechanism supported by the chassis and configured for threshing and separating a crop material, a cleaning system positioned downstream of the threshing and separating mechanism in a direction of crop material flow, and an auxiliary processing system positioned downstream of the threshing and separating mechanism in the direction of crop material flow. The auxiliary processing system is configured for processing crop material exiting from the threshing and separating mechanism and for rethreshing the crop material from the cleaning system. The auxiliary processing system has an inlet and an outlet, and includes a discharge chopper having an end and a first direction of rotation about an axis of rotation. The auxiliary processing system also includes at least one rethreshing element coaxially aligned with the discharge chopper and adjacent to the end of the discharge chopper, and having a second direction of rotation opposite to the first direction of rotation of the discharge chopper.

In yet another exemplary embodiment provided in accordance with the present invention, an agricultural vehicle includes a chassis, a threshing and separating mechanism supported by the chassis and configured for threshing and separating a crop material, a cleaning system positioned downstream of the threshing and separating mechanism in a direction of crop material flow, and an auxiliary processing system positioned downstream of the threshing and separating mechanism in the direction of crop material flow. The auxiliary processing system is configured for processing crop material exiting from the threshing and separating mechanism and for rethreshing the crop material from the cleaning system. The auxiliary processing system has an inlet, an outlet, a discharge chopper which has an end and a first direction of rotation about an axis of rotation, and at least one rethreshing element coaxially aligned with the discharge chopper and adjacent to the end of the discharge chopper and having a second direction of rotation which is the same as the first direction of rotation of the discharge chopper.

In yet another exemplary embodiment provided in accordance with the present invention, a method of operating an agricultural vehicle that has a chassis, a threshing and separating mechanism, and a cleaning system. The method includes the steps of providing an auxiliary processing system configured for rethreshing a crop material. The auxiliary processing system has an inlet, an outlet, a discharge chopper that has an end and a first direction of rotation about an axis of rotation, and at least one rethreshing element coaxially aligned with the discharge chopper and adjacent to the end of the discharge chopper and having a second direction of rotation. The method also includes the step of processing crop material, by the discharge chopper, which has entered the inlet of the auxiliary processing system after passing through the threshing and separating mechanism. The method also includes the step of rethreshing a plurality of tailings, by said at least one rethreshing element, which has entered the inlet of the auxiliary processing system after passing through the cleaning system. The method also includes the step of discharging a material other than grain out through the outlet of the auxiliary processing system.

An advantage of the exemplary embodiment of the present invention is that the auxiliary processing system utilizes space internal to the combine, as opposed to volume consumed outside of the chassis of the combine.

Another advantage of the exemplary embodiment of the present invention is that the auxiliary processing system reduces the tailings volume contribution to the cleaning system.

Yet another advantage of the exemplary embodiment of the present invention is that the auxiliary processing system reduces energy consumption during operation of the combine because the tailings rethresher element may be driven by the discharge chopper.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
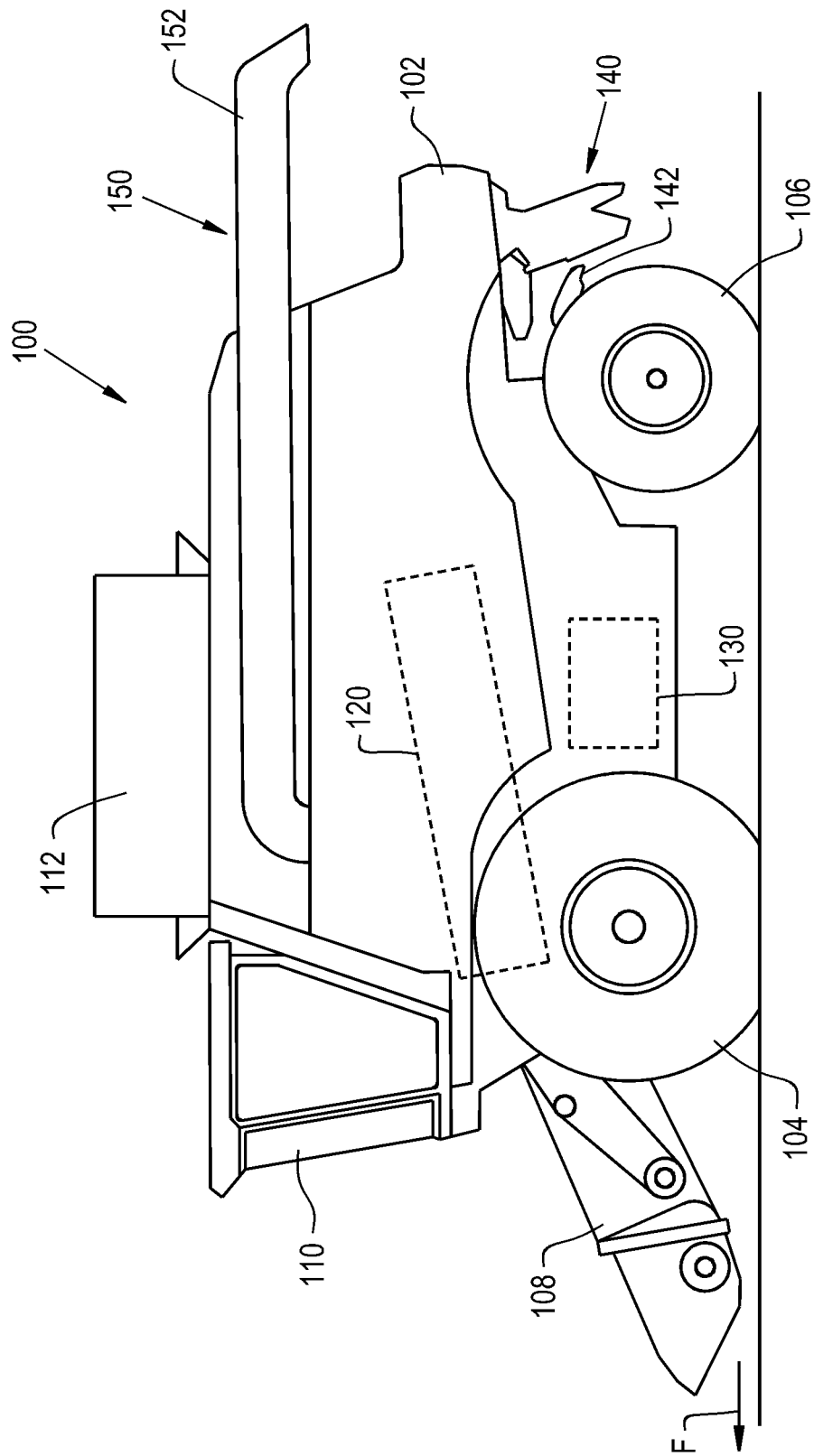
FIG. 1 illustrates a side view of an exemplary embodiment of an agricultural vehicle with an auxiliary processing system, in accordance with an exemplary embodiment of the present invention.
Figure 2:
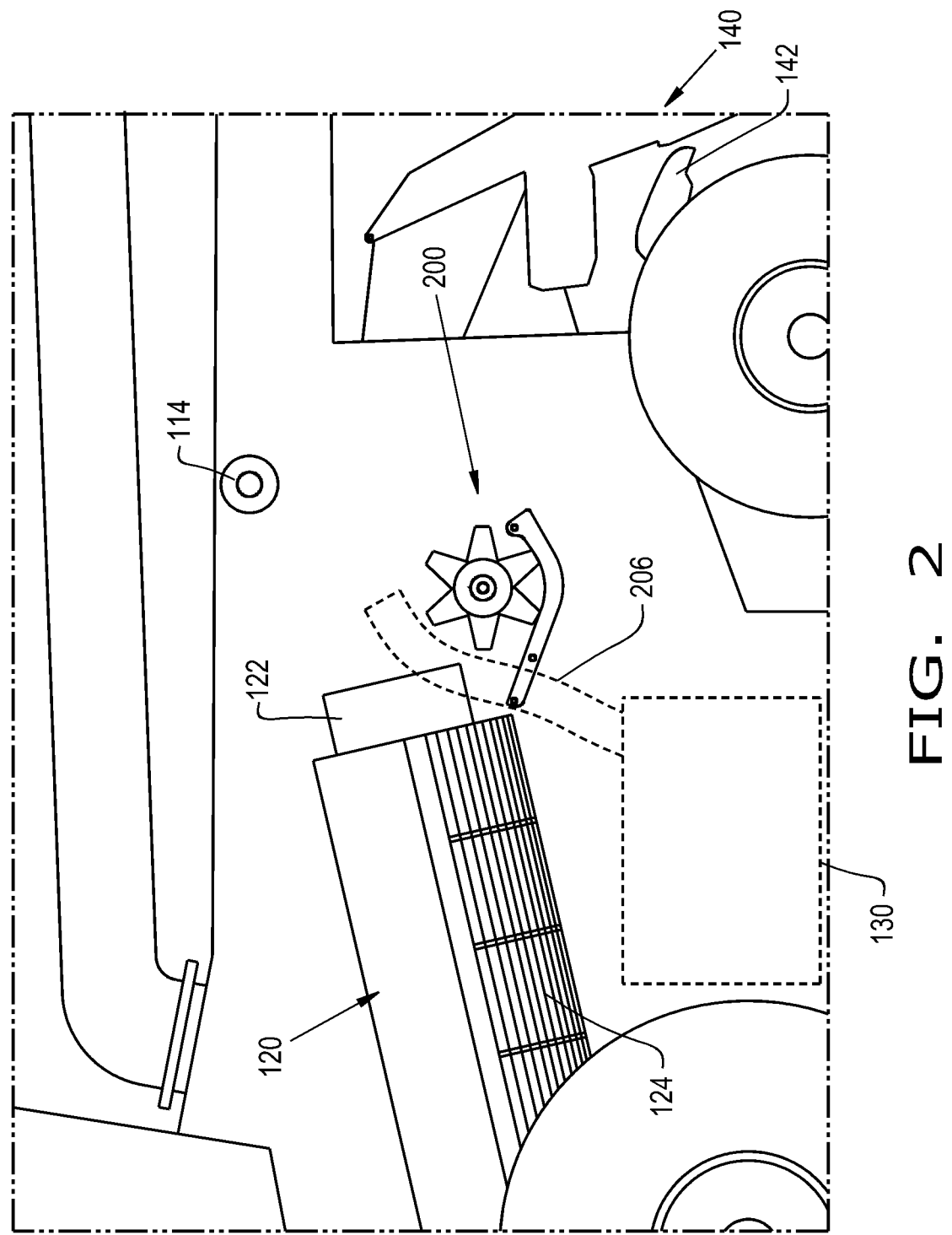
FIG. 2 illustrates a side view of the auxiliary processing system which generally includes the chopper and the tailings processor, in accordance with an exemplary embodiment of the present invention.

Referring now to the drawings, and more particularly to FIGS. 1-2, there is shown an exemplary embodiment of an agricultural vehicle 100 which travels along a field in a forward direction F. The agricultural vehicle 100 may be in the form of a combine 100, which generally includes a chassis 102, front and rear wheels 104, 106, a feeder housing 108, an operator cab 110, a grain tank 112, a threshing and separating system 120, a cleaning system 130, a residue system 140, and an unloading system 150.

The chassis 102 is supported by the wheels 104, 106. The front wheels 104 can be larger flotation type wheels, and the rear wheels 106 can be smaller steerable wheels. Motive force is selectively applied to the front wheels 104 through a prime mover 114 in the form of a diesel engine 114 and a transmission (not shown).

The threshing and separating mechanism 120 may include a rotor 122 and one or more concave(s) 124. The rotor 122 may be enclosed by and rotatable within the concave(s) 124. The cut crop material may be threshed and separated by the rotation of the rotor 122 within the concave(s) 124. Larger elements, such as stalks, leaves and the like may be discharged to the residue system 140 for eventually discharging out of the rear of the combine 100. Smaller elements of crop material, including grain and non-grain crop material, and including particles lighter than grain, such as chaff, dust and straw, may be discharged through the perforations of the concave(s) 124. The rotor 122 of the threshing and separating mechanism 120 can be a transverse or axial rotor.

As the crop material is processed through the threshing and separating mechanism 120, grain may fall downwardly towards the cleaning system 130. In other words, the cleaning system 130 is positioned downstream of the threshing and separating mechanism 120 in a direction of crop material flow. The cleaning system 130 may include a grain auger trough, a pre-cleaning sieve, an upper sieve (also known as a chaffer sieve or sieve assembly), a lower sieve (also known as a cleaning sieve), and a cleaning fan (not shown). The fan blows an airstream through the sieves to remove chaff and other impurities such as dust from the grain by making this material airborne for discharge out of the combine 100. The cleaning system 130 may also include a clean grain auger positioned crosswise below and toward the front of the lower sieve and a grain elevator so that the clean grain can be transported to the grain tank. Further, the cleaning system 130 may include a return auger to return the crop material to the upstream end of the cleaning system 130 for repeated cleaning action.

The residue system 140 may include a spreader and/or an exit guide panel which directs the discharged MOG onto the field. In the present exemplary embodiment, the residue system 140 includes a pair of spreaders 142. The spreaders 142 may be designed and function as any desired spreader known in the art.

The unloading system 150 may include a pair of grain tank augers located at the bottom of the grain tank 112 (not shown) and an unloading auger 152. The grain tank augers may convey the clean grain laterally within grain tank 112 into the unloading auger 152. The unloading auger 152 may swivel to be placed over a transport trailer in order for the clean grain to be unloaded and transported by a transport vehicle.

Figure 3:
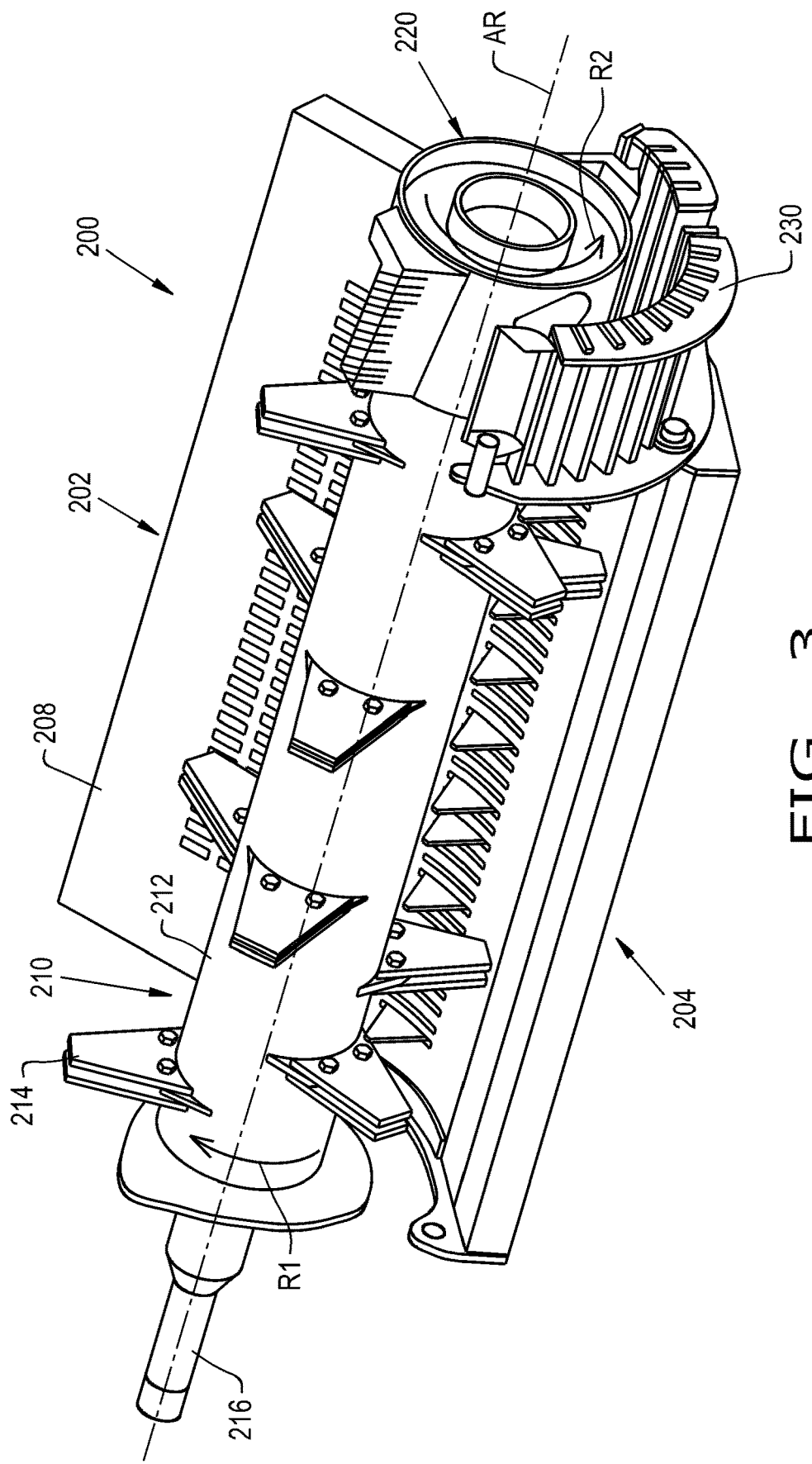
FIG. 3 illustrates a perspective view of the auxiliary processing system of the agricultural vehicle of FIG. 1, in accordance with an exemplary embodiment of the present invention.
Figure 4:
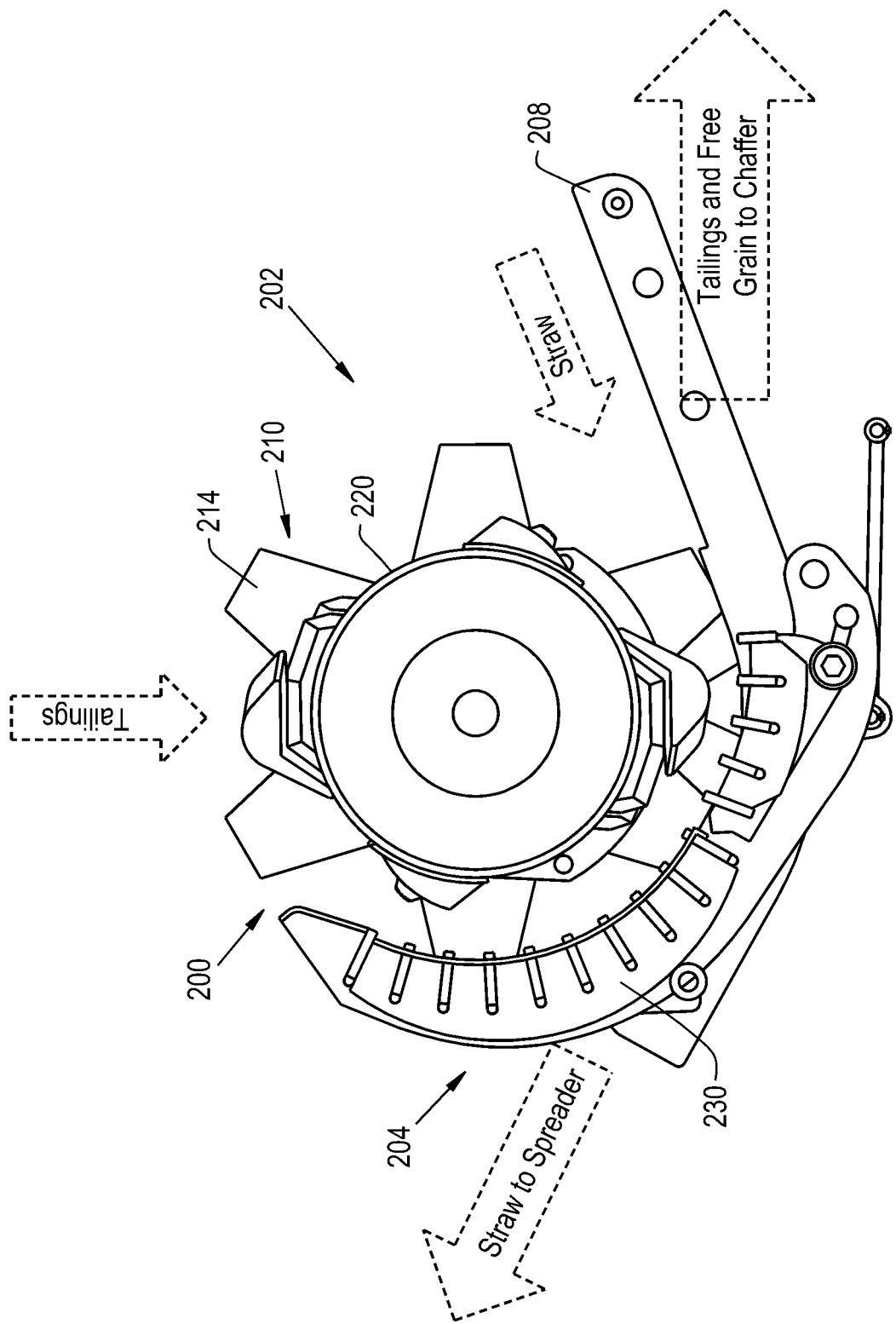
FIG. 4 illustrates a side view of the auxiliary processing system of the agricultural vehicle of FIG. 1, in accordance with an exemplary embodiment of the present invention.

Referring now collectively to FIGS. 2-4, the combine 100 may further include an auxiliary processing system 200 positioned downstream of the threshing and separating mechanism 120 in the direction of crop material flow. The auxiliary processing system 200 may process the crop material exiting the rear of the rotor 122, and rethresh the crop material, e.g. tailings, after it has passed through the cleaning system 130. The auxiliary processing system 200 extends transversely to the direction of travel F of the combine 100. In this regard, the auxiliary processing system is housed within the combine 100 and does not extend beyond the chassis 102. The auxiliary processing system 200 generally includes an inlet 202 and outlet 204, a tailings transporter 206, a perforated floor panel 208, a discharge chopper 210, and a tailings processor in the form of one or more rethreshing element(s) 220 and one or more concave(s) 230.

The inlet 202 receives crop material exiting the threshing and separating mechanism 120 and receives crop material after it has been processed through the cleaning system 130. The outlet 204 allows unwanted crop material, e.g. straw or MOG, to discharge out of the auxiliary processing system 200 onto the residue system 140. More particularly, the outlet 204 discharges the straw to the spreader 142 of the residue system 140. The inlet 202 may be considered the open area above and partially surrounding a side of the discharge chopper 210 and the rethreshing element 220. As shown, the inlet 202 encompasses the open area extending directly above the perforated floor panel 208, in which the crop material, such as straw, from the rotor 122 enters, the open area above the discharge chopper 210, and the open area above and surrounding a side of the rethreshing element 220, in which the tailings from the cleaning system 130 may enter (FIG. 4). The outlet 204 refers to the open space at the rear of the auxiliary processing unit 200, i.e., the left side of the auxiliary processing unit 200 as viewed in FIG. 4.

The tailings transporter 206 may include an auger and/or an elevator, to transport the tailings which were processed through the cleaning system 130 to the rethreshing element(s) 220. The tailings transporter 206 may deposit the crop material, such as the tailings, on top of the rethreshing element 220 at the inlet 202. In an alternative exemplary embodiment, it is conceivable for the tailings transporter 206 to deposit the tailings onto the discharge chopper 210.

The perforated floor panel 208 may be located underneath and extend along the full length of the discharge chopper 210. The perforated floor panel 208 may have a front end 208A for receiving crop material which exits from the rotor 122, and a back end 208B which ejects unwanted crop material onto the residue system 140 through the outlet 204 (FIG. 3). The perforated floor panel 208 may have multiple stationary knives (unnumbered) associated with the discharge chopper 210. The perforated floor panel 208 may be composed of any desired material, such as a metal or metal alloy.

The discharge chopper 210 has a pair of lateral ends and a direction of rotation R1 about an axis of rotation AR. The discharge chopper 210 may include a discharge rotor 212 and a plurality of knives 214. The discharge rotor 212 and the knives 214 may be in the form of any desired rotor and knives known in the art, respectively. The discharge chopper 210 may be operably driven by the prime mover 114 via a shaft 216. As illustrated by the crop material flow arrows in FIGS. 3-4, crop material may enter the inlet 202 near the left end, as shown in FIG. 3, of the discharge chopper 210. The crop material may flow through the discharge chopper from left to right, as shown in FIG. 3. It is possible for some crop material to pass from the discharge chopper 210 to rethreshing element 220 and the concave 230. It should be appreciated that the discharge chopper 210 may alternatively be in the form of a discharge beater.

The rethreshing element 220 may be coaxially aligned, i.e., share the same axis of rotation AR, with the discharge chopper 210 and be adjacent to one of the lateral ends of the discharge chopper 210. In the present exemplary embodiment, the rethreshing element 220 has a direction of rotation R2 opposite to the direction of rotation R1 of the discharge chopper 210. In other words, as shown in FIG. 3, the discharge chopper 210 may be driven by machine left, and the rethreshing element 220 may be driven by machine right. The rethreshing element 220 may be operably driven by the prime mover 114. The rethreshing element 220 may have its own separately controlled speed, independent from the speed of the discharge chopper 210, which is externally controlled through a shaft in a shaft design. The rethreshing element 220 may be in the form of a rethreshing cylinder 220. The crop material fed into the rethreshing element 220 may be threshed in a known fashion. The loose seed and chaff may be spread back onto the cleaning system 130 through the concave 230.

The concave 230 may be located underneath and at least partially surround a portion of the rethreshing element 220. Upon introducing the crop material from above the rethreshing element 220, the crop material is threshed against the concave 230, and grain may exit through the perforations in the concave 230 to the cleaning system 130. Also, the unwanted crop material, such as reprocessed MOG which is not forced through the concave 230, may be expelled onto the residue system 140 and out of the back of the combine 100. In this respect, the tailings volume contribution to the cleaning system 130, for example the cleaning shoe, may be limited. It is conceivable that grain and tailings may exit out of the end of the concave 230 and back to the cleaning system 130. The concave 230 may be moveably mounted relative to the rethreshing element 220. For example, to increase or decrease the threshing capacity of the rethreshing element 220, the concave 230 may be moved toward or downwardly away from the rethreshing element 220. Thereby, the opening between the rethreshing element 220 and the concave 230 may be increased or decreased, allowing for a less harsh or harsher condition for the crop material to pass therethrough, respectively.

It should be appreciated that the rethreshing element 220 and the concave 230 are located at a considerable distance above the cleaning system 130. Thereby, as the grain and MOG falls to the cleaning system 130, the MOG may be blown away via the fan so that the MOG does not enter the cleaning system 130. Hence, the greater distance between the cleaning system 130 and the concave 230 reduces the load on the cleaning system 130.

Figure 5:
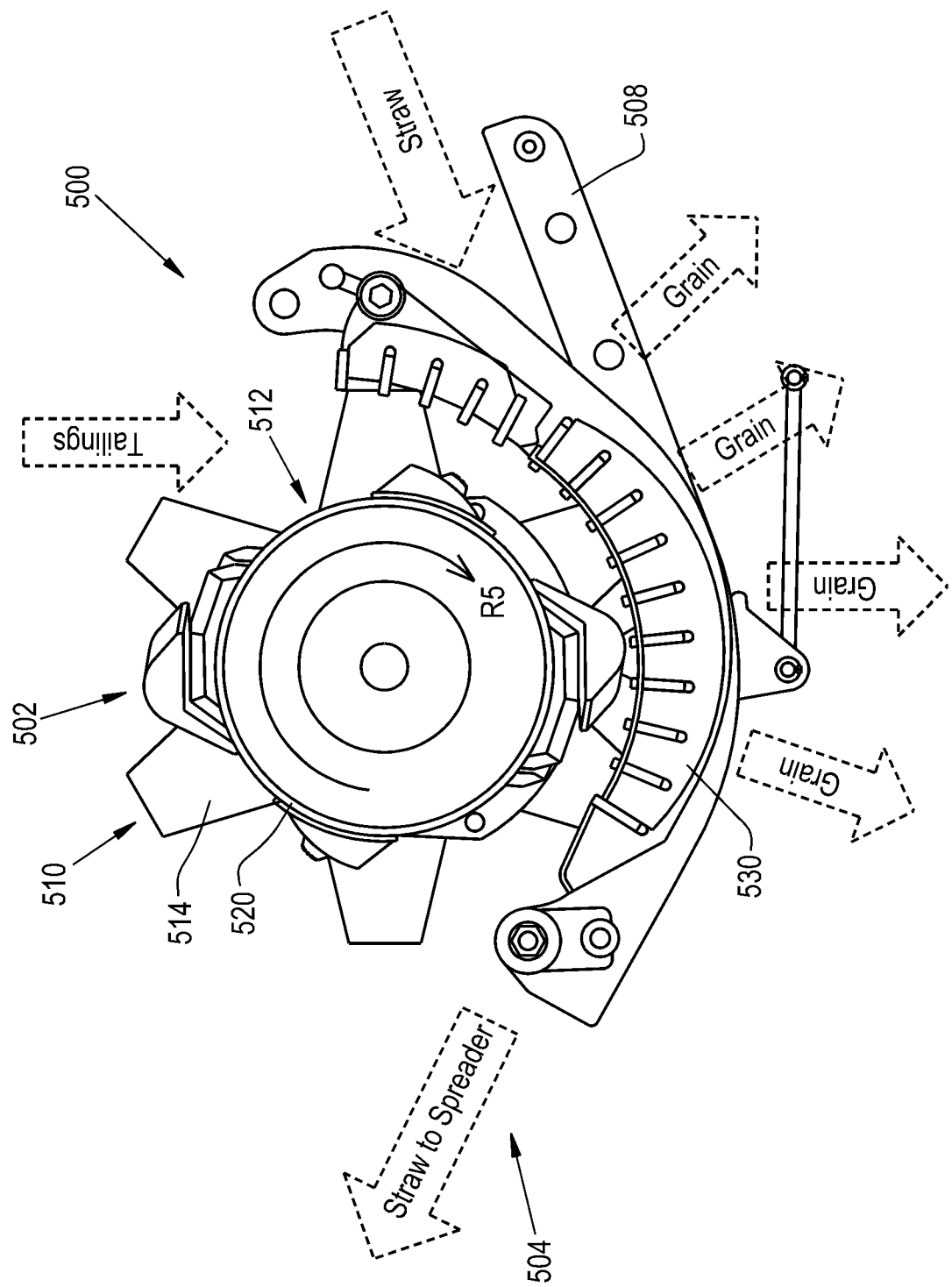
FIG. 5 illustrates a side view of another embodiment of an auxiliary processing system, in accordance with an exemplary embodiment of the present invention.

Referring now to FIG. 5, there is shown another exemplary embodiment of an auxiliary processing system 500 which may be designed similarly to the auxiliary processing system 200, except that the rethreshing element 520 rotates in the same direction of rotation R5 as the discharge chopper 510 and the concave 530 is repositioned accordingly. As such, the auxiliary processing system 500 may include an inlet 502, an outlet 504, a tailings transporter (not shown), a perforated floor panel 508, a discharge chopper 510, and a tailings processor in the form of one or more rethreshing element(s) 520 and one or more concave(s) 530. Similarly to the auxiliary processing system 200, the auxiliary processing system 500 may be incorporated in a combine 100 as discussed above. The discharge chopper 510 may be designed as the discharge chopper 210, and thereby may include a rotor 512 and a plurality of knives 514.

The rethreshing element 520 and the discharge chopper 510 may be linked to one another. For instance, both of the rethreshing element 520 and the discharge chopper 510 may be coupled to and driven by a common shaft which is operably driven by the prime mover 114 of the combine 100. In this regard, the rotational speeds of the rethreshing element 520 and the discharge chopper 510 are linked to one another. Since the rethreshing element 520 and the discharge chopper 510 rotate at the same speed, it should be appreciated that the rethreshing capacity of the rethreshing element 520 may be linked to the discharge chopper 510. In other words, the rethreshing capacity of the rethreshing element 520 may be automatically increased or decreased depending upon whether the combine 100 is operated in a more or less difficult threshing condition. For example, the discharge chopper 510, and thereby the rethreshing element 520, may operate at higher speeds when harvesting wheat or rice, or at lower speeds when harvesting corn.

Figure 6:
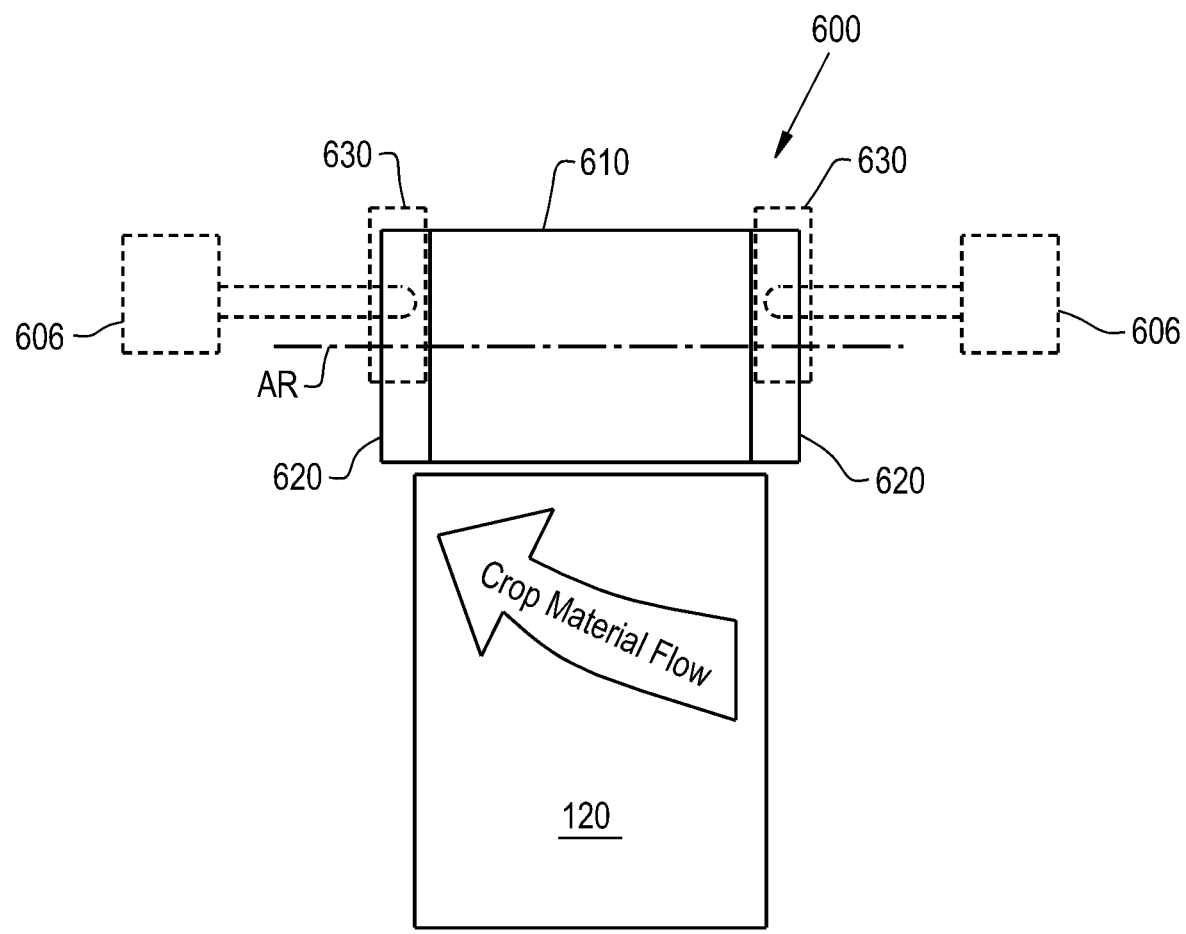
FIG. 6 is a schematic representation of another embodiment of an auxiliary processing system, in accordance with an exemplary embodiment of the present invention.

Referring now to FIG. 6, there is shown a schematic view of another exemplary embodiment of an auxiliary processing system 600 which includes a discharge chopper 610, dual tailings transporters 606, dual rethreshing elements 620, and dual concaves 630. The tailings transporters 606 may be designed as the tailings transporters 206 as described above. The rethreshing elements 620 may be adjacent to each lateral end of the discharge chopper 610 and coaxially aligned with the discharge chopper 610. The auxiliary processing system 600 may be designed and function similarly to either auxiliary processing system 200, 500, as described above, except that it includes dual threshing elements 220 or 520 and dual concaves 230 or 530 respectively mounted to the discharge chopper 210 or 510. The auxiliary processing system 600 may also be incorporated in a combine 100 as with the auxiliary processing systems 200, 500.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
   a chassis;
   a threshing and separating mechanism supported by the chassis and configured for threshing and separating a crop material;
   a cleaning system positioned downstream of the threshing and separating mechanism in a direction of crop material flow; and
   an auxiliary processing system positioned downstream of the threshing and separating mechanism in the direction of crop material flow and configured for processing crop material exiting from the threshing and separating mechanism and for rethreshing the crop material from the cleaning system, the auxiliary processing system having an inlet and an outlet, the auxiliary processing system including:
      a discharge chopper having an end and a first direction of rotation about an axis of rotation; and
      at least one rethreshing element coaxially aligned with the discharge chopper and adjacent to the end of the discharge chopper and having a second direction of rotation opposite to the first direction of rotation of the discharge chopper.

2. The agricultural vehicle of claim 1, wherein said discharge chopper has a first rotational speed and said at least one rethreshing element has a second rotational speed that is independent from the first rotational speed of the discharge chopper.

3. The agricultural vehicle of claim 1, further including a residue system for dispensing a material other than grain out of the combine, and wherein said inlet of the auxiliary processing system receives crop material exiting the threshing and separating mechanism and receives crop material after processing through the cleaning system, and said outlet discharges the material other than grain onto the residue system.

4. The agricultural vehicle of claim 1, wherein said auxiliary processing system further includes a perforated floor panel positioned underneath said discharge chopper.

5. The agricultural vehicle of claim 1, wherein said auxiliary processing system further includes at least one concave at least partially surrounding said at least one rethreshing element.

6. The agricultural vehicle of claim 1, wherein said at least one rethreshing element is in the form of a rethreshing cylinder.

7. The agricultural vehicle of claim 1, wherein said auxiliary processing system extends transversely to a direction of travel of the agricultural vehicle.

8. The agricultural vehicle of claim 1, wherein said at least one rethreshing element is in the form of a pair of rethreshing elements adjacent to each lateral end of the discharge chopper and coaxially aligned with the discharge chopper.

9. An agricultural vehicle, comprising:
   a chassis;
   a threshing and separating mechanism supported by the chassis and configured for threshing and separating a crop material;
   a cleaning system positioned downstream of the threshing and separating mechanism in a direction of crop material flow; and
   an auxiliary processing system positioned downstream of the threshing and separating mechanism in the direction of crop material flow and configured for rethreshing the crop material, the auxiliary processing system having an inlet and an outlet, the auxiliary processing system including:
      a discharge chopper having an end and a first direction of rotation about an axis of rotation; and
      at least one rethreshing element coaxially aligned with the discharge chopper and adjacent to the end of the discharge chopper the at least one rethreshing element is in the form of a rethreshing cylinder, and the at least one rethreshing element and the discharge chopper are coupled to and driven by a common shaft, and the at least one rethreshing element having a second direction of rotation which is the same as the first direction of rotation of the discharge chopper.

10. The agricultural vehicle of claim 9, wherein said discharge chopper has a first rotational speed and said at least one rethreshing element has a second rotational speed that is linked to the first rotational speed of the discharge chopper.

11. The agricultural vehicle of claim 9, further including a residue system for dispensing a material other than grain out of the combine, and wherein said inlet of the auxiliary processing system receives crop material exiting the threshing and separating mechanism and receives crop material after processing through the cleaning system, and said outlet discharges the material other than grain onto the residue system.

12. The agricultural vehicle of claim 9, wherein said auxiliary processing system further includes a perforated floor panel positioned underneath said discharge chopper.

13. The agricultural vehicle of claim 9, wherein said auxiliary processing system further includes at least one concave at least partially surrounding said at least one rethreshing element.

14. The agricultural vehicle of claim 9, wherein said at least one rethreshing element is in the form of a pair of rethreshing elements adjacent to each lateral end of the discharge chopper and coaxially aligned with the discharge chopper.

15. A method of operating an agricultural vehicle having a chassis, a threshing and separating mechanism, and a cleaning system, said method comprising the steps of:
   providing an auxiliary processing system configured for rethreshing a crop material, the auxiliary processing system having an inlet and an outlet, the auxiliary processing system including a discharge chopper having an end and a first direction of rotation about an axis of rotation, and at least one rethreshing element coaxially aligned with the discharge chopper and adjacent to the end of the discharge chopper and having a second direction of rotation, and the at least one rethreshing element is in the form of a rethreshing cylinder;
   processing crop material, by the discharge chopper, which has entered the inlet of the auxiliary processing system after passing through the threshing and separating mechanism;
   rethreshing a plurality of tailings, by said at least one rethreshing element, which has entered the inlet of the auxiliary processing system after passing through the cleaning system; and
   discharging a material other than grain out through the outlet of the auxiliary processing system.

16. The method of claim 15, wherein the second direction of rotation of said at least one rethreshing element is opposite to the first direction of rotation of the discharge chopper.

17. The method of claim 15, wherein the second direction of rotation of said at least one rethreshing element is the same as the first direction of rotation of the discharge chopper.

18. The method of claim 15, wherein said at least one rethreshing element is in the form of a pair of rethreshing elements adjacent to each lateral end of the discharge chopper and coaxially aligned with the discharge chopper.

* * * * *